No. 876,515. PATENTED JAN. 14, 1908.
B. L. BARNES.
ELECTRICAL BINDING CLIP.
APPLICATION FILED DEC. 17, 1906.
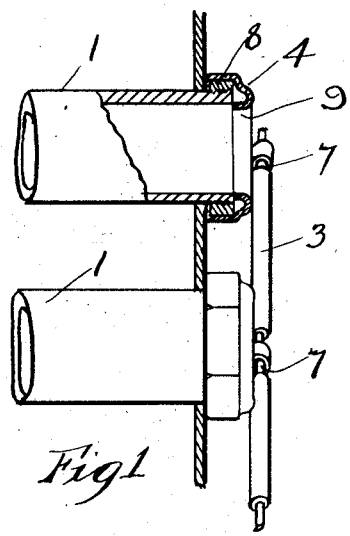
Fig 1.
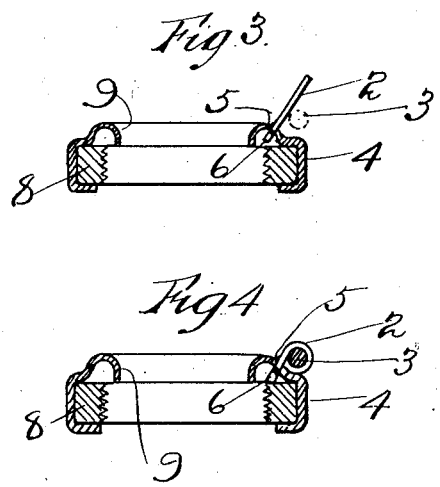
Fig 3.
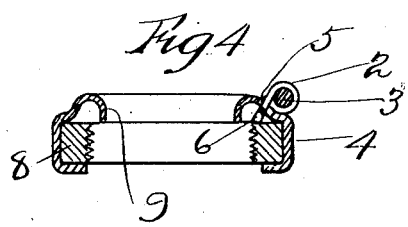
Fig 4.
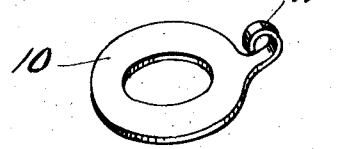
Fig. 2.
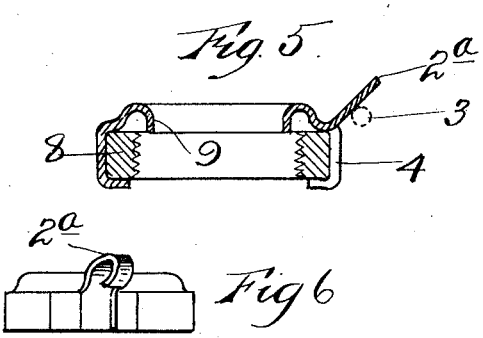
Fig. 5.
Fig 6.
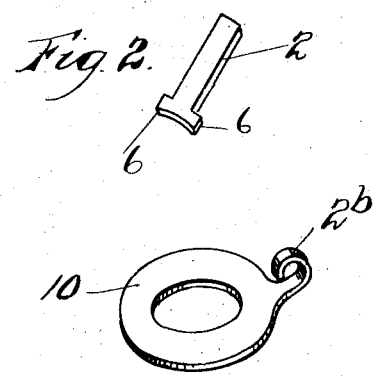
Fig 8.
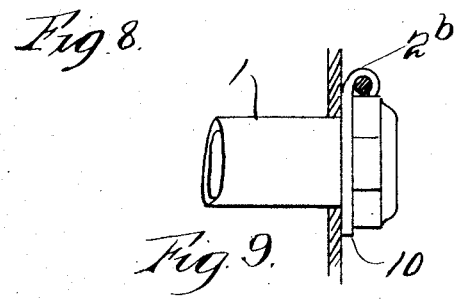
Fig. 9.
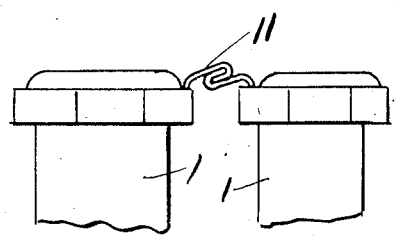
Fig 7.
Inventor
Bradbury L. Barnes.
Witnesses
E. D. Ogden
A. L. Makepeace
By
Howard E. Barlow
Attorney

UNITED STATES PATENT OFFICE.

BRADBURY LEONARD BARNES, OF PROVIDENCE, RHODE ISLAND.

ELECTRICAL BINDING-CLIP.

No. 876,515.      Specification of Letters Patent.      Patented Jan. 14, 1908.

Application filed December 17, 1906. Serial No. 348,145.

*To all whom it may concern:*

Be it known that I, BRADBURY LEONARD BARNES, a citizen of the United States, residing at the city of Providence, in the county of Providence and State of Rhode Island, have invented certain new and useful Improvements in Electrical Binding-Clips, of which the following is a specification, reference being had therein to the accompanying drawing.

This invention relates to a binding clip for making permanent electrical connections, and has for its object to provide a pliable clip that is adapted to be readily attached to the ends of electric conduits, and one that may also serve to connect said conduits together or connect them with conducting wires or the like, by being bent over or around the same to form a strong, permanent and complete metallic connection thereto.

The National Board of Fire Underwriters require that metal conduits carrying electrical conductors must be grounded by a separate and independent conductor. A conducting wire is usually employed for this purpose, said wire being usually connected to these conduits by means of soldering, which is not considered satisfactory and practical on account of its liability to be easily broken away.

My improved device provides a strong, durable and at the same time pliable clip or finger adapted to be readily connected to the end of a conduit by various means, and then to connect the conduits together or connect them to the conducting wire, said clip being especially adapted to be bent over or around said wire to permanently retain the same in its grip, after which a more complete connection may be made by flowing solder into the joint, if desired.

By the use of my improved construction the disadvantages of the methods heretofore employed are entirely obviated and a permanent, complete and lasting connection is easily and quickly made by its use.

The invention is fully described in this specification and more particularly pointed out in the appended claims.

In the accompanying drawings: Figure 1—illustrates a plurality of conduit ends connected together by a conducting wire, said ends being supplied with a threaded binding nut and bushing to which my improved clip is attached and by which the joint is formed to said wire. Fig. 2—is a detail view in perspective of my improved clip detached. Fig. 3—represents a check nut inclosed in a metallic casing forming a bushing for the conduit and my improved pliable clip being attached to said casing. Fig. 4—shows the nut and casing as represented in Fig. 3 with my improved clip bent around and engaging a conducting wire. Fig. 5—illustrates a nut and casing with a portion of the casing turned up to form a clip or pliable finger integral therewith, adapted to be bent around and engage a conducting wire or the like. Fig. 6—shows a perspective view of said casing and finger. Fig. 7—illustrates the ends of two pipes connected by clasping their clips together, thus doing away with a connecting wire. Fig. 8—illustrates a modification showing the clip as applied to and made integral with a washer, which may be connected to the conduit by any suitable means. Fig. 9—shows the washer with my clip attached thereto, the same being held to the conduit by a nut, said clip being bent around a conducting wire to make a permanent connection to the conduit.

Referring to the drawings at 1—1 are the ends of conduits which may be left dead-ended at any convenient point, or led into outlet boxes or cabinets. In every case the law requires that these conduits, in whatever position installed, must be permanently and effectually grounded.

The conduits are usually constructed of metal pipes or tubing and their ends are usually sharp or rough and are liable to abraid, cut or otherwise injure the insulation of the electric wires while being drawn therethrough. To guard against this trouble it is necessary that a bushing of some suitable construction shall be attached to the ends of these pipes to lead the wires into the same clear of said sharp edges. Various means have been provided for this purpose among others being the check-nut 8 to which has been attached a sheet metal casing or jacket 4 designed to embrace the nut for the purpose of supporting the nicely rounded bushing 9 which forms a smooth entrance to the conduit for the covered wires. It is found that a conductor wire 3, (see Fig. 1,) connected to the ends of these conductors is the simplest and most desirable and effective means for complying with the law for permanently grounding the conduits. In order to make the connections to this wire in the strongest and simplest manner I have provided a pliable clip or finger 2 which may be readily attached to the ends of the pipes 1 either by forming the same separate and connecting it to the casing 4 of the checknut, as shown in Figs. 3 and 4, or turning up a portion 2$^a$ of the casing itself forming a finger integral therewith, as shown in Fig. 5, or by means of forming a washer 10 provided with an extending finger 2$^b$, as shown in Figs. 8 and 9.

The clip in its preferred form is made in a T-shape having a comparatively long shank 2 with shoulders 6—6 at one end thereof. This clip is preferably made of pliable conducting material that may be easily bent into the desired form, that portion of the shank that engages the wire being previously tinned if desired. In applying this clip to the check-nut casing the latter is provided with a hole or slot 5 formed near the upper edge thereof through which slot the end of the clip is passed from the inside outward, the shoulders 6—6 bringing up on the inside of the casing. The clip may then be turned over the wire 3 in the manner illustrated in Fig. 4 or two of the fingers may be crimped or interlocked together in the manner illustrated at 11 in Fig. 7, thereby permanently electrically connecting two of the adjacent conduits without the use of an independent wire.

In some cases a molded nut provided with a guiding bushing is used on the conduits and some of such bushings have been provided with a rigid ear cast on its side having a hole through which the connecting wire may be passed. It is found in practice that such a construction has its disadvantages, as it is often impossible to pass the connecting wire through these eyes on account of the close proximity and varied position of the ends of the conduits and the ears on the same. Then again, when an insulated wire is used the hole in the ear must be large enough to admit the wire, insulation and all to pass therethrough when connected up in the manner illustrated in Fig. 1 of the drawings, while by the use of my pliable clip the insulated conductor wire 3 will only have to be skinned at the connecting points 7—7, where the clip engages the same.

The device is extremely simple and effective and by its use the attaching of the ground conductor to the conduits, (in order to meet the insurance requirements), is greatly facilitated.

Having thus described my invention, what I claim as new and desire to secure by Letters Patent, is:

1. A device of the character described comprising a conduit, a conduit binding nut and bushing, and a pliable binding finger adapted to be bent around the conductor said finger being electrically connected to said conduit.

2. A device of the character described, comprising a conduit, a guide bushing attached to said conduit, and a pliable binding finger adapted to be connected to the conductor by being bent around the same, said finger being electrically connected to said conduit.

3. A device of the character described, comprising a conduit, a guide bushing attached to the end of said conduit, and a pliable binding finger connected to said bushing, said finger having a free end adapted to be bent around the conductor to make a ready connection thereto.

4. A device of the character described comprising a conduit, a binding nut, a guide bushing attached to said nut, and a pliable binding finger connected to said bushing, said finger having a free end adapted to embrace the conductor.

5. A device of the character described, comprising a conduit, a binding nut, a guide bushing supported in position by said nut, and a pliable binding finger electrically connected to said conduit and also supported in position by said nut, said finger having a free end adapted to embrace the conductor.

6. A device of the character described comprising a conduit, a binding nut therefor, a casing on said nut forming a guide bushing, said casing being provided with a pliable finger adapted to be bent around inclose and retain a conductor in its grasp.

7. A device of the character described comprising a conduit, a binding nut, a guide bushing attached to said nut, and means on said bushing adapted to be bent over an electrical conductor to retain the same.

8. A device of the character described, comprising a conduit, a binding nut, a guide bushing supported in position by said nut, and means retained by said nut adapted to be bent over an electrical conductor to retain the same.

9. A device of the character described comprising a conduit, a binding nut therefor, a casing on said nut forming a guide bushing, and means on said casing adapted to be bent over an electrical conductor to retain the same.

10. A device of the character described comprising a conduit, a binding nut therefor, a casing on said nut forming a guide bushing, said casing being provided with an aperture and a pliable binding clip adapted to pass through said aperture, and means in said clip whereby the same is retained in said aperture.

11. A device of the character described comprising a conduit, a binding nut therefor, a casing on said nut forming a guide bushing, said casing being provided with a slot, and a pliable binding clip provided with a body portion and a T-shaped head, said body portion being adapted to be passed through said slot in the casing to be subsequently bent around a conductor to permanently and electrically connect the same to said conduit.

In testimony whereof I affix my signature in presence of two witnesses.

BRADBURY LEONARD BARNES.

Witnesses:
HOWARD E. BARLOW,
E. I. OGDEN.